United States Patent
Watson et al.

(10) Patent No.: US 12,486,052 B2
(45) Date of Patent: Dec. 2, 2025

(54) DARKFIELD LIGHTING SOURCE FOR AIRCRAFT FOD DETECTION

(71) Applicant: Lockheed Martin Corporation, Bethesda, MD (US)

(72) Inventors: Virgil R. Watson, Trumbull, CT (US); Christian David Gerhardt, Palm Beach Gardens, FL (US); David B. Tabak, Hamden, CT (US); Andrew J. Burke, Bridgeport, CT (US); Anthony Dicocco, Stratford, CT (US); William Grayson Richmond, Glen Allen, VA (US); Thomas Lee Merrill, Clinton, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 135 days.

(21) Appl. No.: 18/483,986

(22) Filed: Oct. 10, 2023

(65) Prior Publication Data

US 2025/0115373 A1      Apr. 10, 2025

(51) Int. Cl.
| | |
|---|---|
| *B64F 5/60* | (2017.01) |
| *F21L 4/02* | (2006.01) |
| *F21V 33/00* | (2006.01) |
| *H04N 23/56* | (2023.01) |
| *H04N 23/957* | (2023.01) |

(Continued)

(52) U.S. Cl.
CPC .................. *B64F 5/60* (2017.01); *F21L 4/02* (2013.01); *F21V 33/0084* (2013.01); *H04N 23/56* (2023.01); *H04N 23/957* (2023.01); *F21Y 2107/30* (2016.08); *F21Y 2113/13* (2016.08); *F21Y 2115/10* (2016.08)

(58) Field of Classification Search
CPC ............................. B64F 5/60; G01N 21/8803
See application file for complete search history.

(56) References Cited

U.S. PATENT DOCUMENTS

| | | | |
|---|---|---|---|
| 7,098,469 B1 | 8/2006 | Carrington | |
| 7,236,625 B2 | 6/2007 | Englebart et al. | |

(Continued)

FOREIGN PATENT DOCUMENTS

| | | | | |
|---|---|---|---|---|
| KR | 200439258 Y1 | * | 3/2008 | ............. E04H 17/20 |
| KR | 102485850 B1 | | 1/2023 | |

(Continued)

OTHER PUBLICATIONS

Extended European Search Report corresponding to European Patent Application No. 24200268.1, dated Mar. 19, 2025, 9 pages.

*Primary Examiner* — Tony Ko
(74) *Attorney, Agent, or Firm* — Baker Botts L.L.P.

(57) ABSTRACT

A lighting device for foreign object debris (FOD) detection is included. The lighting device includes a light source configured to emit light onto a surface, and a diffuser coupled to the light source and configured to cause the emitted light to impinge the surface in at least a partially planar pattern, so as to create a darkfield lighting effect with respect to the surface. The lighting device further includes a cylindrical rod including a first end portion and a second end portion, in which the first end portion is configured to couple to the light source and the diffuser and the second end portion is configured to be manually held by a user of the portable lighting device.

19 Claims, 8 Drawing Sheets

(51) Int. Cl.
*F21Y 107/30* (2016.01)
*F21Y 113/13* (2016.01)
*F21Y 115/10* (2016.01)

(56) References Cited

U.S. PATENT DOCUMENTS

| | | |
|---|---|---|
| 7,617,984 B2 | 11/2009 | Nunnink |
| 8,094,921 B2 | 1/2012 | Englebart et al. |
| 9,536,124 B1* | 1/2017 | Nunnink ............... G02B 6/0096 |
| 2003/0155511 A1* | 8/2003 | Hisazumi ........... G01N 21/3563 |
| | | 250/339.12 |
| 2007/0041201 A1* | 2/2007 | Mazzei ................. G03B 15/02 |
| | | 362/347 |
| 2009/0059590 A1 | 3/2009 | Quattrini, Jr. |
| 2010/0097798 A1 | 4/2010 | Young |
| 2010/0315022 A1 | 12/2010 | Schnitzer |
| 2011/0213664 A1* | 9/2011 | Osterhout ............... G06F 3/013 |
| | | 705/14.58 |
| 2022/0125268 A1 | 4/2022 | Kim |

FOREIGN PATENT DOCUMENTS

| | | | |
|---|---|---|---|
| WO | 2022139138 A1 | 6/2022 | |
| WO | 2022102637 A1 | 9/2022 | |

\* cited by examiner

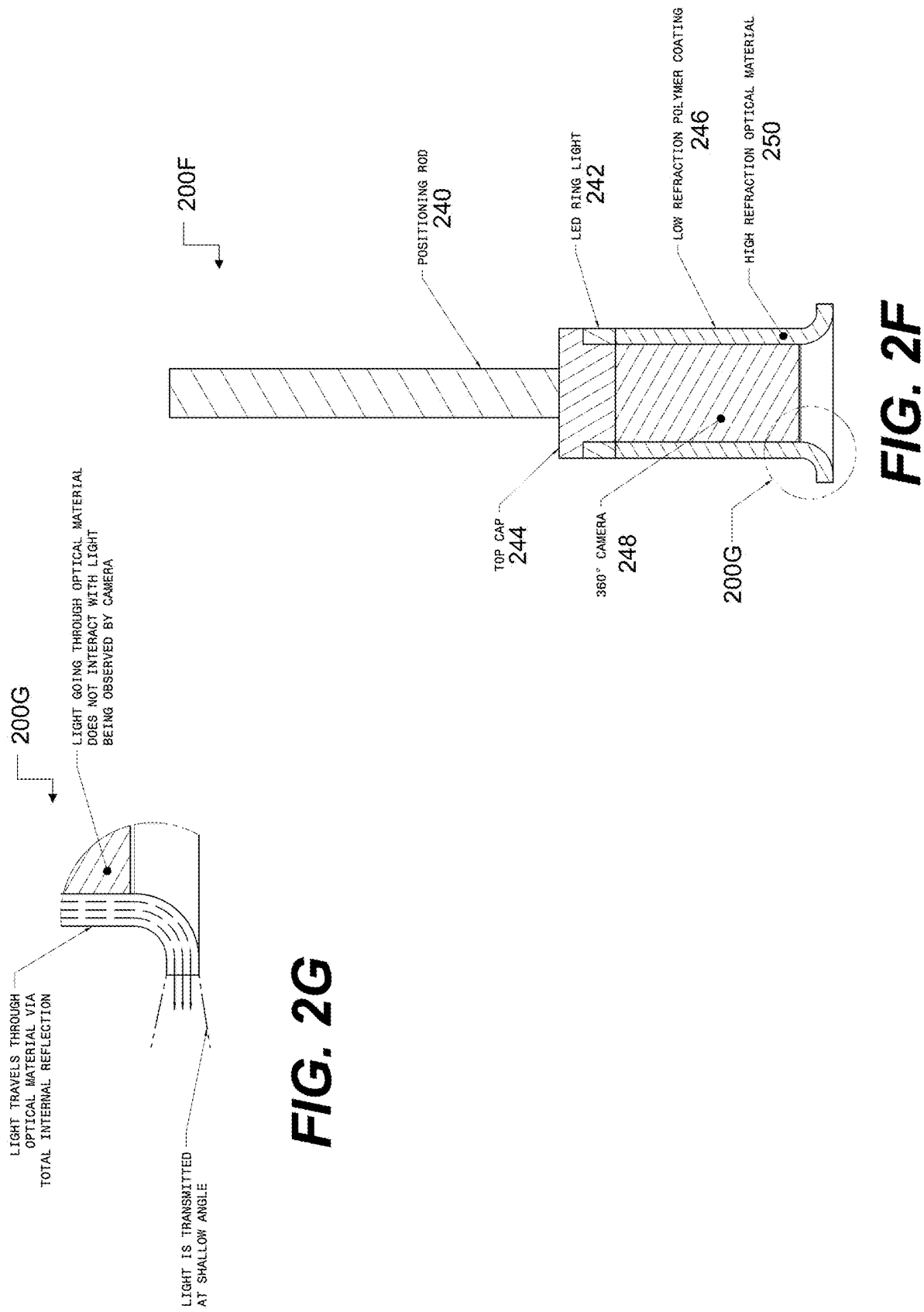

DARKFIELD LIGHTING SOURCE FOR AIRCRAFT FOD DETECTION

TECHNICAL FIELD

This disclosure relates generally to lighting sources, and, more specifically, to a darkfield lighting source for aircraft foreign object debris (FOD) detection.

BACKGROUND

Foreign object debris (FOD) may generally include any object that may be located in an inappropriate location, for example, with respect to one or more components of an aircraft or other industrial system. For example, mechanics or other similar technicians may be tasked with removing FOD from fuel cells and/or other enclosed aircraft components to ensure an optimal operation of the aircraft. In some instances, FOD may include materials that are difficult to distinguish from the surrounding areas. Such materials may include transparent plastics, glass shards, or other materials that may be imperceptible to inspecting technicians. It may be useful to provide techniques to better detect and identify FOD.

BRIEF DESCRIPTION OF THE DRAWINGS

FIGS. 2D-2G illustrate an innovative lighting system incorporated with a transparent optical light conduit.

DESCRIPTION OF EXAMPLE EMBODIMENTS

Overview

Figure 1:
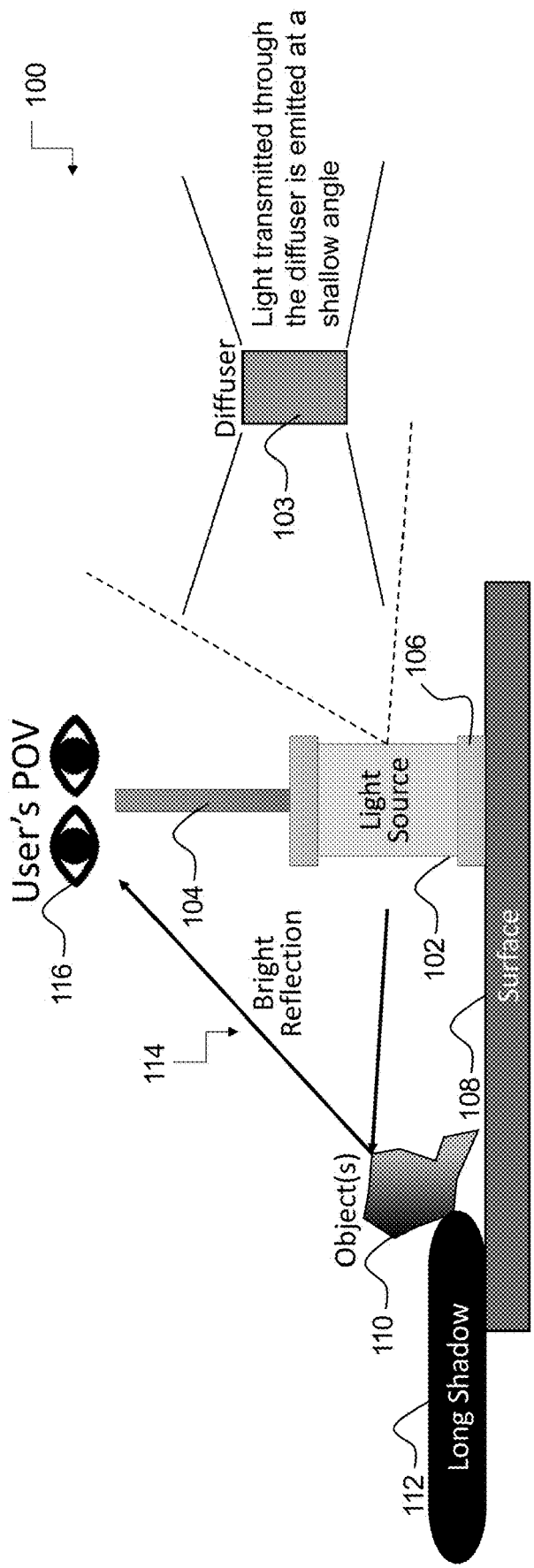
FIG. 1 illustrates an example lighting system for foreign object debris (FOD) detection.

The present embodiments are directed to techniques for providing a handheld lighting system including one or more lighting devices for creating a darkfield lighting effect for improved foreign object debris (FOD) detection. In particular embodiments, the lighting system may include a light source configured to emit light onto a surface and a diffuser coupled to the light source and configured to cause the emitted light to impinge the surface in an at least partially planar pattern, so as to create a darkfield lighting effect with respect to the surface. In particular embodiments, the lighting system may further include a cylindrical rod including a first end portion and a second end portion. In one embodiment, the first end portion is attached to the light source and the diffuser. In one embodiment, the second end portion is configured to be manually held by a user of the lighting device.

In particular embodiments, the diffuser may be configured to cause the emitted light to impinge the surface in the at least partially planar pattern by reducing an amount of the emitted light emitted perpendicularly to the surface. For example, in some embodiments, the diffuser may include one or more of a polarizing diffuser or a film-based diffuser. In particular embodiments, the darkfield lighting effect with respect to the surface may be created utilizing one or more reflective cones coupled to the light source. In another embodiment, the darkfield lighting effect with respect to the surface may be created utilizing one or more fiber optic cables coupled to the light source. In another embodiment, the darkfield lighting effect with respect to the surface may be created utilizing one or more light-emitting diodes (LEDs) associated with the light source.

In one embodiment, the first end portion may be configured to couple to the light source via a swivel mechanism. In particular embodiments, the first end portion of the cylindrical rod may be configured to be positioned perpendicularly with respect to the surface, such that the emitted light causes a bright reflection or a long shadow with respect to an object disposed on the surface. In particular embodiments, the cylindrical rod may be configured to mechanically extend and to mechanically retract so as to configurably adjust a length of the cylindrical rod.

Technical advantages of particular embodiments of this disclosure may include one or more of the following. Certain systems and methods described herein provide a hand-held lighting device utilized for foreign-object debris (FOD) detection and aircraft inspection. In particular embodiments, a light source may be attached at a first end of a cylindrical rod configured to create a darkfield lighting effect with respect to the surface. In particular embodiments, the darkfield lighting effect may ensure that more light is emitted parallel to the underlying surface than that emitted perpendicularly to the surface. In particular embodiments, the darkfield lighting effect may engender high contrast reflections and shadows with respect to one or more objects (e.g., FOD) disposed on the surface.

For example, in particular embodiments, a 360 degree light source may be filtered with a diffuser or lens, which may be utilized to reduce an amount of light travelling perpendicularly to the surface, such that the majority of the emitted light is emitted radially in a planar pattern (e.g., across the periphery of the surface). In particular embodiments, a swivel mechanism may also be positioned at the portion of the cylindrical rod to which the light source is attached. By creating a darkfield lighting effect across the surface, any objects (e.g., FOD) disposed on the surface will reflect the light up to the point of view (POV) of the user of the lighting system, and further cause bright reflected areas and long shadows with respect to the objects (e.g., FOD) disposed on the surface. In this way, the present embodiments may improve FOD detection and inspection.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

FIG. 1 illustrates an example lighting system 100 for foreign object debris (FOD) detection, in accordance with the presently disclosed embodiments. In particular embodiments, the lighting system 100 may include, for example, a hand-held lighting system 100 utilized for foreign-object debris (FOD) detection and aircraft inspection. In particular embodiments, a light source 102 may be attached at a first end of a cylindrical rod 104 (e.g., a rigid, stainless steel rod, a rigid tube, a flexible tube, a flexible, aluminum rod, and so forth) configured to create a darkfield lighting effect with respect to the surface 108. In accordance with the present embodiments, the darkfield lighting effect may ensure, for example, that a greater amount of light is emitted in a parallel direction with respect to the surface 108 as compared to the light that is emitted perpendicularly to the surface 108. In particular embodiments, the darkfield lighting effect may engender high-contrast bright reflections 114 and long shadows 112 with respect to one or more objects 110 (e.g., FOD) disposed on the surface 108.

Figure 2A:
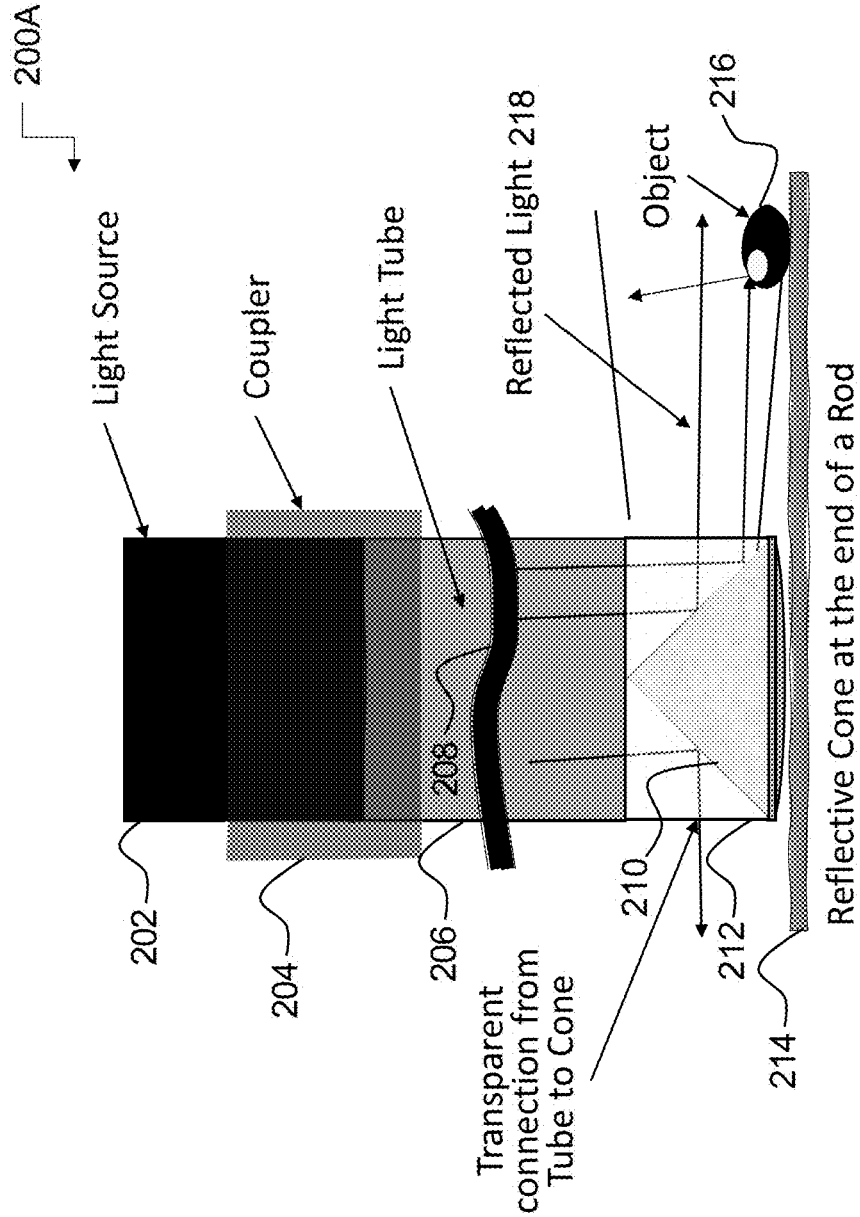
FIGS. 2A-2C illustrate lighting devices for creating a darkfield lighting effect.
Figure 2B:
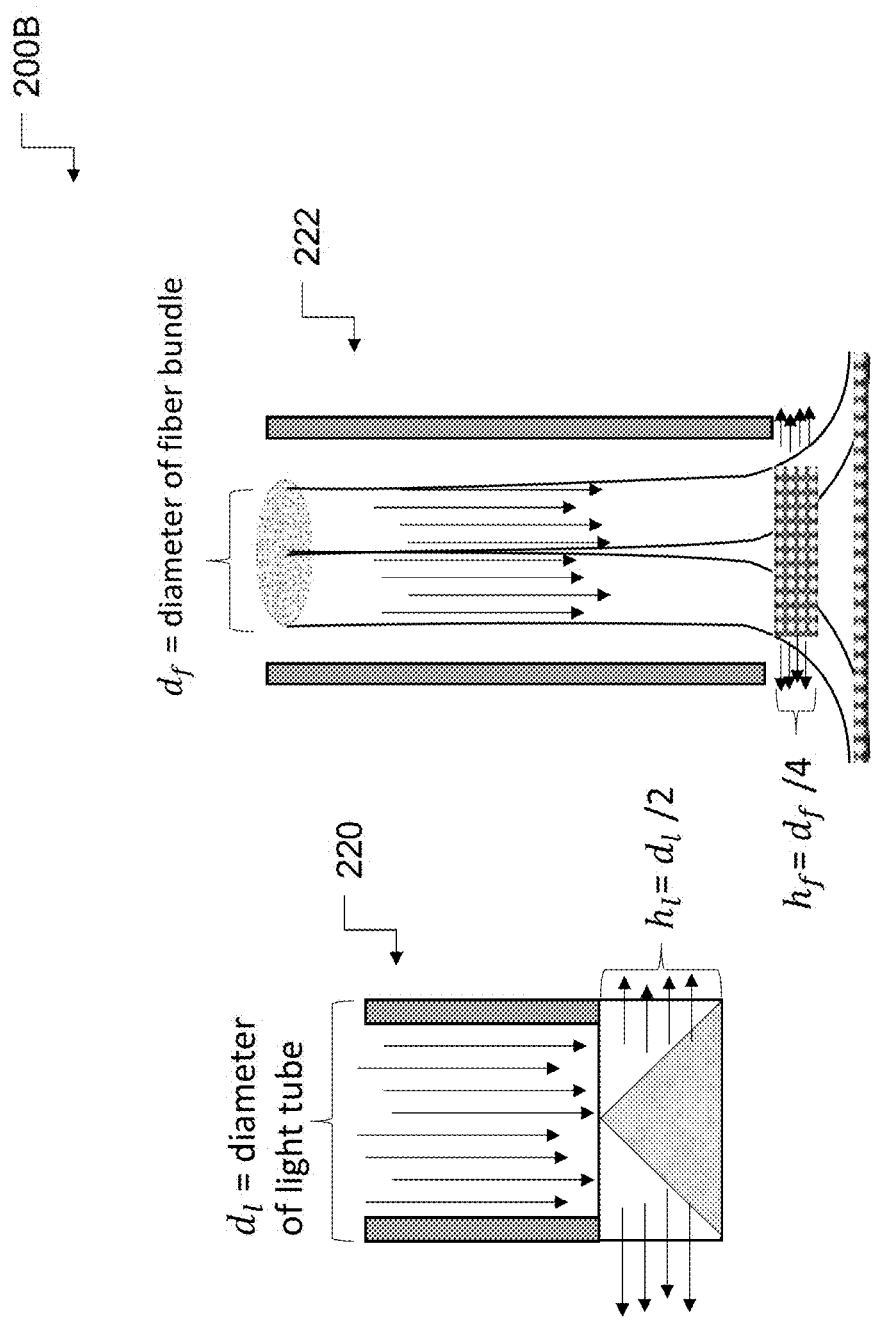
Figure 2C:
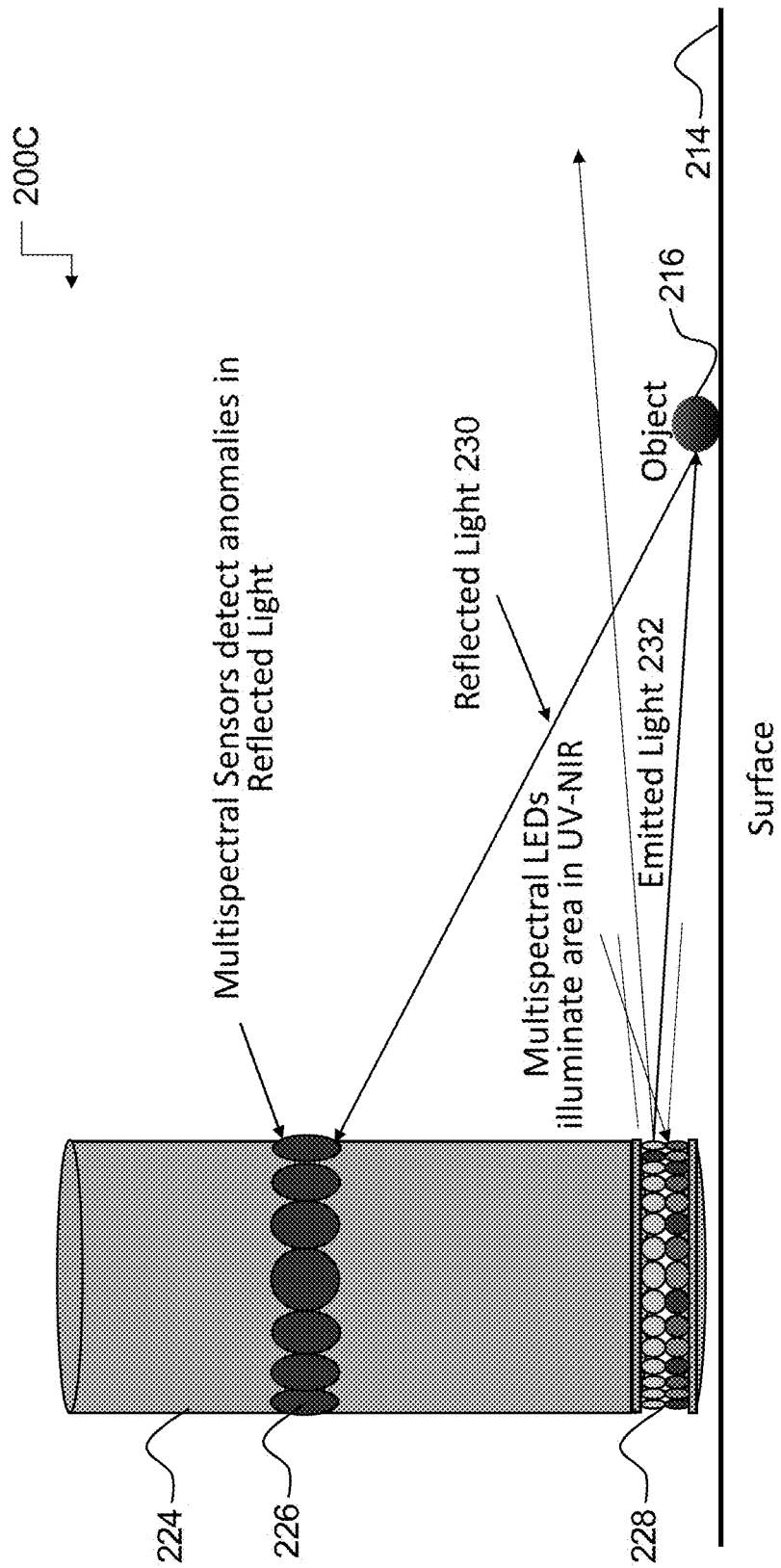
Figure 2D:
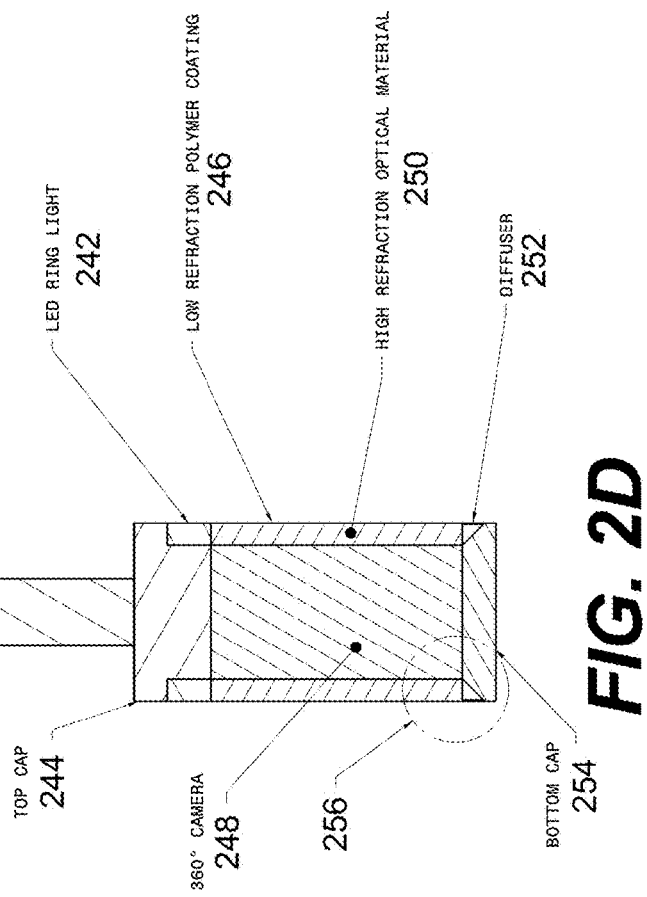
Figure 2E:
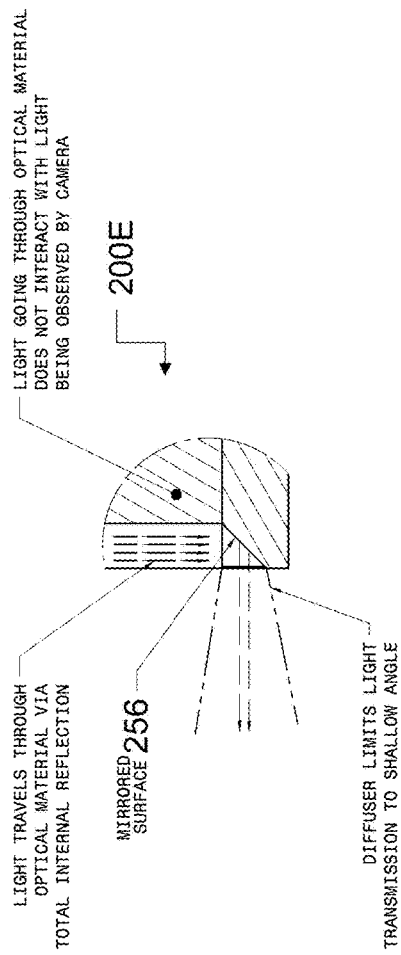

For example, in particular embodiments, the light source 102 may include a 360 degree light source. In particular embodiments, the light source 102 may be filtered with a diffuser 103 or lens, which may be utilized to reduce an amount of light propagating perpendicularly to the surface 108, such that a greater amount of the emitted light is emitted radially in a planar pattern with respect to the surface 108 (e.g., across the periphery of the surface 108). In particular embodiments, one or more swivel mechanisms 106 may also be positioned at the portion of the cylindrical rod 104 to which the light source 102 is attached. By creating a darkfield lighting effect across the surface 108, any objects 110 (e.g., FOD) disposed on the surface 108 will reflect the light up to the point of view (POV) 116 of the user of the lighting system 100, and further engender the high-contrast bright reflections 114 and long shadows 112 with respect to the objects 110 (e.g., FOD) disposed on the surface 108. In this way, the present embodiments may improve FOD detection and inspection FIGS. 2A-2C illustrate lighting devices 200A, 200B, and 200C, respectively, for creating a darkfield lighting effect, in accordance with the presently disclosed embodiments. In particular embodiments, as depicted by FIG. 2A, the lighting device 200A may include a light source 202, a coupler 204, a light tube 206 including a filtering portion 208, and a reflecting cone 210 coupled to the light tube by way of a transparent connection 212. As further depicted, the lighting device 202A may emit light onto a surface 214. In particular embodiments, the reflecting cone 210 may cause the emitted light to be reflected (e.g., reflected light 218) off the one or more objects 216 (e.g., FOD) as an indication of a presence of FOD.

In particular embodiments, as depicted by FIG. 2B, the lighting device 200B may include a light tube 220 and a fiber optic cable bundle 222. In particular embodiments, the fiber optic cable bundle 222 may serve as a light channel, for example, suitable for directing light from a light source downward and outwardly through a cylindrically arranged output as depicted. In some embodiments, the height of cylinder of fibers may be ¼ of the diameter of the fiber optic cable bundle 222, and, as the light is directed further outwardly, the height of cylinder of fibers may be further reduced to as small as 1 fiber high. The height of the emitted light when using a 45 degree conical mirror, such as reflecting cone 210, for example, may be ½ of the diameter of the light column.

In particular embodiments, as depicted by FIG. 200C, a multispectral sensor device 224 may operate by emitting light 232 to illuminate and impinge onto the surface 214 beneath the multispectral sensor device 224. For example, in particular embodiments, one or more LEDs 228 of the multispectral sensor device 224 may illuminate the surface 214 to manifest a presence of one or more objects 216 (e.g., FOD) disposed on the surface 214. In particular embodiments, one or more multispectral sensors 226 of the multispectral sensor device 224 may detect the presence of the one or more objects 216 (e.g., FOD) disposed on the surface 214 based on the reflected light 230 reflected off the one or more objects 216 (e.g., FOD).

In one embodiment, the one or more objects 216 (e.g., FOD) may be a material reflective of ultraviolet (UV) light, infrared (IR) light, near infrared light (NIR), or other light that may be reflected by the one or more objects 216 (e.g., FOD) and detected by the multispectral sensors 226. In particular embodiments, the one or more multispectral sensors 226 may then detect a variation of the emitted light 232 (e.g., a phase shift, a change in polarization, and so forth) based on the reflected light 230 reflected off the one or more objects 216 (e.g., FOD) as indication of foreign object debris in accordance with the presently disclosed embodiments.

FIGS. 2D-2G illustrate example embodiments of lighting systems incorporated with a transparent optical light channels 200D, 200E, 200F, and 200G. In particular embodiments, the transparent optical light channels 200D, 200E, 200F, and 200G may be strategically designed to direct light from an originating source 242 situated proximally to a handle 240 of the channels, circumventing a 360-degree camera 248, and ultimately guiding the optical light towards a location beneath the 360-degree camera 248. In particular embodiments, the transparent optical light channels 200D, 200E, 200F, and 200G employ total internal reflection methodologies to facilitate light transmission along its axis from the originating source 242 down towards the bottom cap portion 254. In particular embodiments, the transparent nature of the transparent optical light channels 200D, 200E, 200F, and 200G allow ambient light present in the surrounding environment to permeate radially inward into the core structure of a 360-degree camera 248, and thus provides better enabling image capture capabilities.

In particular embodiments, various techniques may be employed by the transparent optical light channels 200D, 200E, 200F, and 200G for creation and dispersion of an illuminating disc. For example, these techniques may include application of high and low refraction index materials 246, 250, reflective surfaces 256, optical films, and/or curvature manipulation within its structure, as depicted by FIG. 2G. Such configurations may allow for radiating light radially outward from the central assembly body, which consequently generates desired shallow angles instrumental for darkfield lighting effects. This arrangement facilitates positioning the light assembly and the surface in close proximity thereby reducing overall size dimensions associated with illumination provision. Thus, providing the specialized design of the transparent optical light channels 200D, 200E, 200F, and 200G effectively mitigates obstructions that might otherwise interfere with comprehensive visual coverage offered by the 360-degree camera 248.

Figure 3:
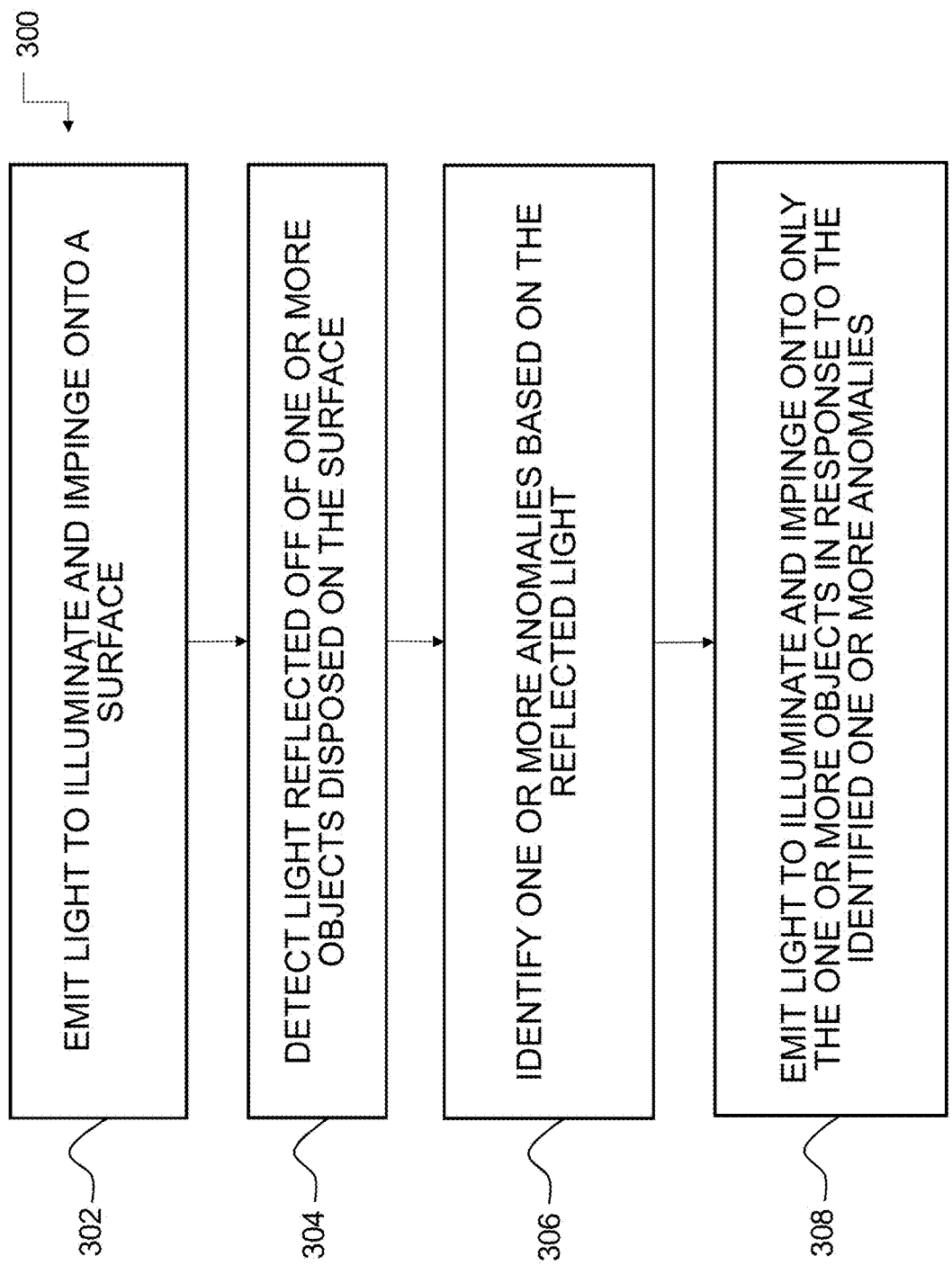
FIG. 3 illustrates a flow diagram of a method for performing multispectral foreign object debris (FOD) detection.

FIG. 3 illustrates a flow diagram of a method 300 for performing multispectral foreign object debris (FOD) detection, in accordance with the presently disclosed embodiments. The method 300 may be performed utilizing one or more processors that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing intents and/or desire states), software (e.g., instructions running/executing on one or more processors), firmware (e.g., microcode), or any combination thereof.

The method 300 may begin at block 302 with one or more processors causing a multispectral sensor device 224 to emit light 232 to illuminate and impinge onto a surface beneath the multispectral sensor device 224. For example, in particular embodiments, the one or more processors may cause one or more LEDs 228 of the multispectral sensor device 224 illuminate surroundings to manifest a presence of one or more objects 216 (e.g., FOD) disposed on the surface 214. The method 300 may continue at block 304 with one or more processors causing the multispectral sensor device 224 to detected off one or more objects disposed on the surface. For example, in particular embodiments, the one or more processors may cause one or more multispectral sensors 226 of the multispectral sensor device 224 detect the presence of the one or more objects 216 (e.g., FOD) disposed on the surface 214 based on the reflected light 230 reflected off the one or more objects 216 (e.g., FOD). In one embodiment, the one or more objects 216 (e.g., FOD) may be a material reflective of ultraviolet (UV) light, infrared (IR) light, near infrared light (NIR), or other light that may be reflected by the one or more objects 216 (e.g., FOD) and detected by the multispectral sensors 226.

The method 300 may continue at block 306 with the one or more processors causing the multispectral sensor device 224 identifying one or more anomalies based on the reflected light. For example, in particular embodiments, the one or more processors may identify a variation of the emitted light 232 (e.g., a phase shift, a change in polarization, and so forth) based on the reflected light 230 reflected off the one or more objects 216 (e.g., FOD). The method 300 may then conclude at block 308 with the one or more processors causing the multispectral sensor device 224 emit light 232 to illuminate and impinge onto only the one or more objects 216 (e.g., FOD) in response to the identified one or more anomalies. For example, in one embodiment, the one or more LEDs 228 illuminate in only the direction of detected FOD using visible wavelengths to alert, for example, the user or an operator.

Figure 4:
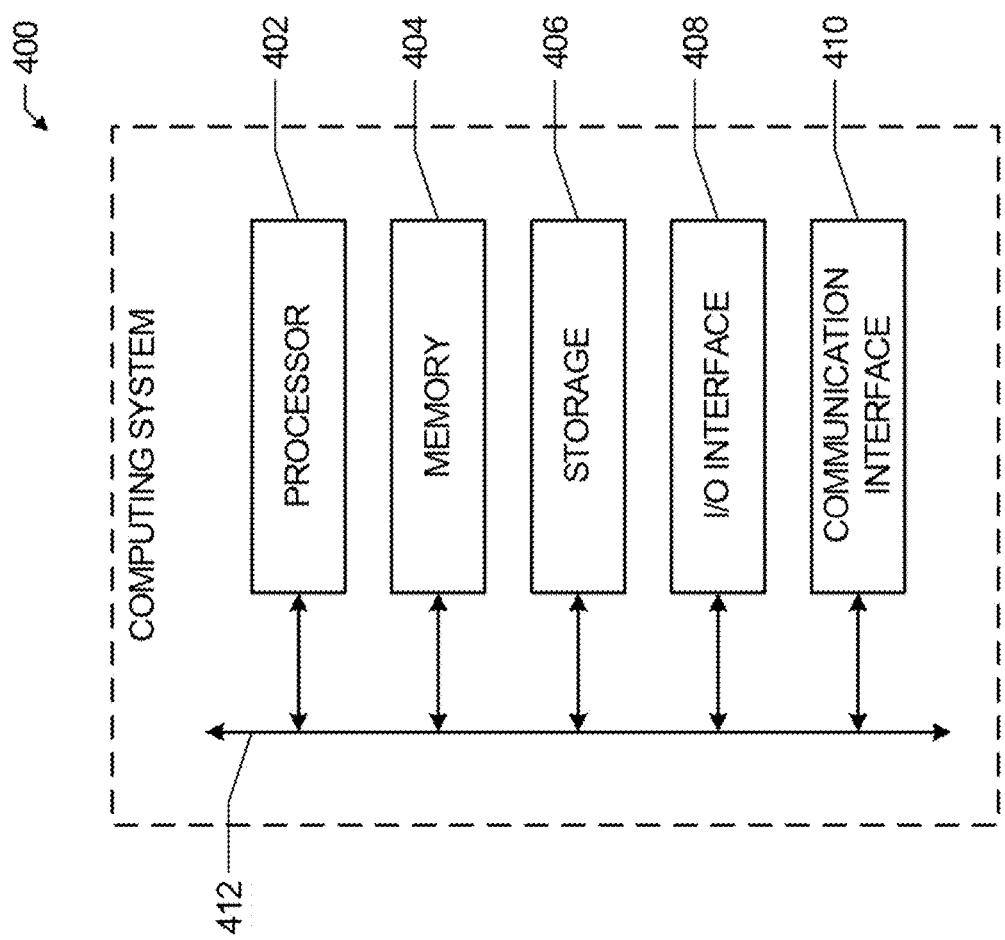
FIG. 4 illustrates an example computer system.

FIG. 4 illustrates an example computer system 400 that may be useful in performing one or more of the foregoing techniques as presently disclosed herein. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein.

As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate. In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402.

Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 602. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A lighting device for foreign object debris (FOD) detection, comprising:
   a light source configured to emit light onto a surface;
   a diffuser coupled to the light source and configured to cause the emitted light to impinge the surface in an at least partially planar pattern to create a darkfield lighting effect with respect to the surface;
   a cylindrical rod including a first end portion and a second end portion, wherein the first end portion is attached to the light source and the diffuser, and wherein the second end portion is configured to be manually held by a user of the lighting device; and
   one or more transparent optical light channels configured to route light from the light source to a 360-degree camera assembly to maximize the darkfield lighting effect.

2. The lighting device of claim 1, wherein the diffuser is configured to cause the emitted light to impinge the surface in the at least partially planar pattern by reducing an amount of the emitted light emitted perpendicularly to the surface.

3. The lighting device of claim 2, wherein the diffuser comprises one or more of a polarizing diffuser or a film-based diffuser.

4. The lighting device of claim 1, wherein the darkfield lighting effect with respect to the surface is created utilizing one or more reflective cones coupled to the light source.

5. The lighting device of claim 1, wherein the darkfield lighting effect with respect to the surface is created utilizing one or more fiber optic cables coupled to the light source.

6. The lighting device of claim 1, wherein the darkfield lighting effect with respect to the surface is created utilizing one or more light-emitting diodes (LEDs) associated with the light source.

7. The lighting device of claim 1, wherein the first end portion is configured to couple to the light source via a swivel mechanism.

8. The lighting device of claim 1, wherein the first end portion of the cylindrical rod is configured to be positioned perpendicularly with respect to the surface, such that the emitted light causes a bright reflection or a long shadow with respect to an object disposed on the surface.

9. The lighting device of claim 1, wherein the cylindrical rod is configured to mechanically extend and to mechanically retract so as to configurably adjust a length of the cylindrical rod.

10. A system, comprising:
    a surface;
    a light source configured to emit light onto the surface;
    a diffuser coupled to the light source and configured to cause the emitted light to impinge the surface in an at least partially planar pattern to create a darkfield lighting effect with respect to the surface and to reflect light off one or more objects disposed on the surface;
    a cylindrical rod including a first end portion and a second end portion, wherein the first end portion is attached to the light source and the diffuser, and wherein the second end portion is configured to be manually held by a user of the system; and
    one or more transparent optical light channels configured to route light from the light source to a 360-degree camera assembly to maximize the darkfield lighting effect.

11. The system of claim 10, wherein the diffuser is configured to cause the emitted light to impinge the surface in the at least partially planar pattern by reducing an amount of the emitted light emitted perpendicularly to the surface.

12. The system of claim 11, wherein the diffuser comprises one or more of a polarizing diffuser or a film-based diffuser.

13. The system of claim 10, wherein the darkfield lighting effect with respect to the surface is created utilizing one or more reflective cones coupled to the light source.

14. The system of claim 10, wherein the darkfield lighting effect with respect to the surface is created utilizing one or more fiber optic cables coupled to the light source.

15. The system of claim 10, wherein the darkfield lighting effect with respect to the surface is created utilizing one or more light-emitting diodes (LEDs) associated with the light source.

16. The system of claim 10, wherein the first end portion is configured to couple to the light source via a swivel mechanism.

17. The system of claim 10, wherein the first end portion of the cylindrical rod is configured to be positioned perpendicularly with respect to the surface, such that the emitted light causes a bright reflection or a long shadow with respect to an object disposed on the surface.

18. The system of claim 10, wherein the cylindrical rod is configured to mechanically extend and to mechanically retract so as to configurably adjust a length of the cylindrical rod.

19. A lighting tool, comprising:
    a light source configured to emit light onto a surface;
    a diffuser coupled to the light source and configured to cause the emitted light to impinge the surface in an at least partially planar pattern to create a darkfield lighting effect with respect to the surface;
    a cylindrical rod including a first end portion and a second end portion, wherein the first end portion is attached to the light source and the diffuser, and wherein the second end portion is configured to be manually held by a user of the lighting tool; and one or more transparent optical light channels configured to route light from the light source to a 360-degree camera assembly to maximize the darkfield lighting effect.

* * * * *